(12) United States Patent
Kato

(10) Patent No.: US 8,889,584 B2
(45) Date of Patent: Nov. 18, 2014

(54) APPARATUS FOR PRODUCTION OF FUEL CELL CATALYST LAYER, METHOD FOR PRODUCTION OF FUEL CELL CATALYST LAYER, POLYELECTROLYTE SOLUTION, AND PROCESS FOR PRODUCTION OF POLYELECTROLYTE SOLUTION

(75) Inventor: Hidemi Kato, Tokyo (JP)

(73) Assignee: Kabushikikaisha Equos Research, Tokyo (JP)

( * ) Notice: Subject to any disclaimer, the term of this patent is extended or adjusted under 35 U.S.C. 154(b) by 0 days.

(21) Appl. No.: 13/498,190

(22) PCT Filed: Jan. 7, 2011

(86) PCT No.: PCT/JP2011/050169
§ 371 (c)(1),
(2), (4) Date: Nov. 1, 2012

(87) PCT Pub. No.: WO2011/083842
PCT Pub. Date: Jul. 14, 2011

(65) Prior Publication Data
US 2013/0045864 A1 Feb. 21, 2013

(30) Foreign Application Priority Data

Jan. 7, 2010 (JP) .................................. 2010-002362
Dec. 24, 2010 (JP) .................................. 2010-288034
Dec. 28, 2010 (JP) .................................. 2010-291730

(51) Int. Cl.
*H01M 8/10* (2006.01)
*H01M 4/88* (2006.01)
*H01M 4/92* (2006.01)

(52) U.S. Cl.
CPC ............ *H01M 4/8807* (2013.01); *Y02E 60/522* (2013.01); *H01M 2008/1095* (2013.01); *Y02E 60/50* (2013.01); *H01M 4/926* (2013.01)
USPC ........................................................ 502/159

(58) Field of Classification Search
None
See application file for complete search history.

(56) References Cited

FOREIGN PATENT DOCUMENTS

| JP | 06-260179 A | 9/1994 |
|---|---|---|
| JP | 10-003929 A | 1/1998 |
| JP | 2006-066309 A | 3/2006 |
| JP | 2009-104905 A | 5/2009 |

*Primary Examiner* — Melissa Swain
(74) *Attorney, Agent, or Firm* — Bacon & Thomas, PLLC

(57) ABSTRACT

An apparatus for production of a fuel cell catalyst layer forming a catalyst layer by a catalyst paste, the apparatus including a device for removal of water to obtain a polyelectrolyte solution by reducing, to a predetermined value or less, the concentration of water in a pre-solution in which a polyelectrolyte having a side chain including a hydrophilic functional group is dissolved in a solvent; and an agitator means for obtaining the catalyst paste by mixing a pre-paste obtained by mixing a catalyst with water and the polyelectrolyte solution.

4 Claims, 6 Drawing Sheets

FIG. 1
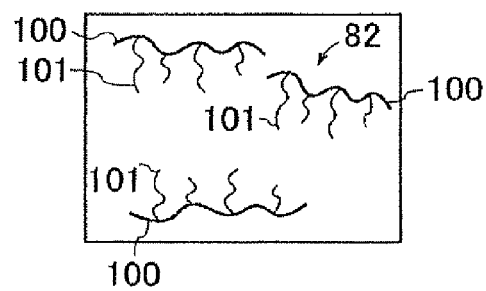
FIG. 2A  FIG. 2B  FIG. 2C
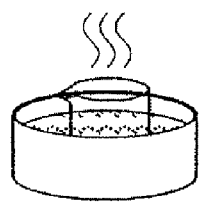 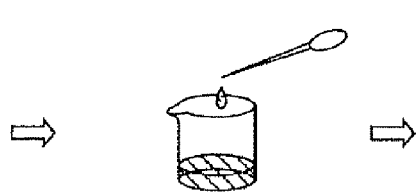 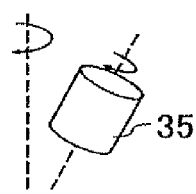
FIG. 2D  FIG. 2E  FIG. 2F
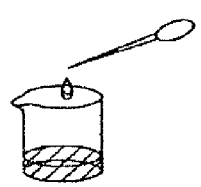 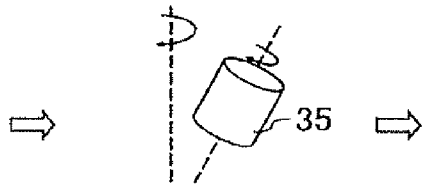 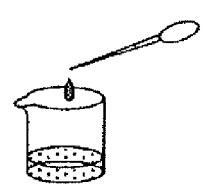
FIG. 2G  FIG. 2H
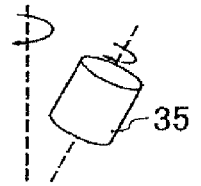 

APPARATUS FOR PRODUCTION OF FUEL CELL CATALYST LAYER, METHOD FOR PRODUCTION OF FUEL CELL CATALYST LAYER, POLYELECTROLYTE SOLUTION, AND PROCESS FOR PRODUCTION OF POLYELECTROLYTE SOLUTION

TECHNICAL FIELD

The present invention relates to an apparatus for production of a fuel cell catalyst layer, a method for production of the fuel cell catalyst layer, a polyelectrolyte solution, and a process for production of the polyelectrolyte solution.

BACKGROUND ART

Conventionally, there is known a fuel cell system using a membrane electrode assembly (MEA) 90 as disclosed in Patent Document 1. This MEA 90 includes, as shown in FIG. 4, an electrolyte membrane 91 composed of a solid polymer membrane such as Nation (registered trademark of DuPont), a cathode 93 that is bonded to one surface of the electrolyte membrane 91 and supplied with air, and an anode 92 that is bonded to the other surface of the electrolyte membrane 91 and supplied with fuel such as hydrogen.

The cathode 93 is composed of a gas-permeable base material 93b, such as carbon cloth, carbon paper, or carbon felt, and a cathode catalyst layer 93a formed on one surface of the base material 93b. The other part of the cathode 93 than the cathode catalyst layer 93a is the base material 93b, which serves as a cathode diffusion layer that diffuses air to the cathode catalyst layer 93a on the nonelectrolyte side.

The anode 92 is also composed of a base material 92b similar to the base material described above, and an anode catalyst layer 92a formed on one surface of the base material 92b. The other part of the anode 92 than the anode catalyst layer 92a is the base material 92b, which serves as an anode diffusion layer that diffuses fuel to the anode catalyst layer 92a on the nonelectrolyte side.

The cathode catalyst layer 93a and the anode catalyst layer 92a include, as shown in FIG. 5, innumerable pieces of catalysts 81 each composed of a support 81a made of carbon black supporting catalyst metal fine particles 81b of a material such as platinum (Pt), and a polyelectrolyte 82 that binds the pieces of the catalysts 81 to each other and binds them to a base material (not shown). As the polyelectrolyte 82, a similar material to that of the electrolyte membrane 91 is used.

Then, the MEA 90 is sandwiched between separators (not shown) to form a fuel cell serving as a minimum unit of electric power generation, and then, a large number of the cells are stacked together to form a fuel cell stack. The cathode catalyst layer 93a is supplied with air by air supply means, and the anode catalyst layer 92a is supplied with hydrogen or the like by hydrogen supply means or the like. Thus, the fuel cell system is formed.

In the MEA 90, hydrogen ions ($H^+$: protons) and electrons are generated from the fuel by an electrochemical reaction in the anode catalyst layer 92a. Then, the protons move in the electrolyte membrane 91 toward the cathode catalyst layer 93a in the form of $H_3O^+$ accompanied by water molecules. The electrons flow into the cathode catalyst layer 93a though a load connected to the fuel cell system. On the other hand, in the cathode catalyst layer 93a, water is generated from oxygen contained in air, the protons, and the electrons. The electrochemical reaction as described above occurs continuously, whereby the fuel cell system can generate an electromotive force continuously.

RELATED ART DOCUMENT

Patent Document

Patent Document 1: Japanese Patent Application Publication No. JP-A-2009-104905

DISCLOSURE OF THE INVENTION

Problems to be Solved by the Invention

However, the conventional MEA 90 described above is subject to performance degradation due to drying of the polyelectrolyte in the electrolyte membrane and the catalyst layers under low humidified conditions. On the other hand, under over-humidified conditions, performance degradation is caused by blockage of gas supply (flooding) due to accumulation of water. For these reasons, the fuel cell provided with the MEA 90 has a problem of reduction in power generation capacity under the environments described above.

In view of the conventional circumstances described above, it is a problem to be solved by the present invention to obtain a fuel cell catalyst layer that allows an electrochemical reaction to proceed smoothly. In addition, it is another problem to be solved by the present invention to provide a polyelectrolyte solution for obtaining the fuel cell catalyst layer, and a process for producing the polyelectrolyte solution.

Means for Solving the Problems

An apparatus for production of a fuel cell catalyst layer forming a catalyst layer by a catalyst paste according to the present invention is characterized by including water removing means for obtaining a polyelectrolyte solution by reducing to a predetermined value or less a concentration of water in a pre-solution in which a polyelectrolyte having a side chain including a hydrophilic functional group is dissolved in a solvent, and agitating means for obtain the catalyst paste by mixing a pre-paste obtained by mixing a catalyst with water with the polyelectrolyte solution (claim 1).

According to the knowledge of the inventor of the present invention, it is inferred that protons and entrained water are smoothly moved, and generated water is smoothly diffused back and discharged by virtue of the following effect: In the cathode catalyst layer 93a and the anode catalyst layer 92a, a hydrophilic layer 83 is formed by a hydrophilic functional group at an end of a side chain 101 of the polyelectrolyte 82 between the catalyst 81 and a layer of the polyelectrolyte 82. In the catalyst layer in which the hydrophilic layer 83 is aligned in one direction and formed uniformly in a continuous state, the generated water produced in the cathode 93 can be diffused back to the anode 92 while being held in the hydrophilic layer 83 even under low humidified conditions. As a result, the polyelectrolyte 82 in the electrolyte membrane 91 and the catalyst layers is prevented from drying, whereby high performance can be maintained. Also, under over-humidified conditions, the generated water is discharged through the hydrophilic layer 83 in the same manner, whereby performance can be prevented from being degraded.

Therefore, in order to allow the hydrophilic layer 83 to be formed uniformly, the inventor has focused attention on the state of the polyelectrolyte 82 in the polyelectrolyte solution, and has discovered the following knowledge. That is, as shown FIGS. 8A and 8B, the polyelectrolyte 82 has a hydrophobic main chain 100 and the side chain 101 including the hydrophilic functional group. The hydrophilic functional group is formed of, for example, a sulfone group ($SO_3^-$). If the catalyst 81 is mixed with water to form the pre-paste, and then the pre-paste is mixed with the polyelectrolyte solution to form the catalyst paste, the hydrophilic functional group is attracted to the water adhering to the catalyst 81, and thus, the hydrophilic layer 83 is formed in the cathode catalyst layer 93a and the anode catalyst layer 92a.

The inventor has discovered that, when the concentration of water in the polyelectrolyte solution is reduced, the viscosity of the polyelectrolyte solution increases even if the concentration of the polyelectrolyte 82 in the polyelectrolyte solution stays the same. The inventor has also discovered that, when, by contrast, the concentration of water in the polyelectrolyte solution is increased, the viscosity of the polyelectrolyte solution is reduced. From these discoveries, the inventor has inferred that, if the concentration of water in the polyelectrolyte solution is high, the water adheres to the side chain 101 of the polyelectrolyte 82, and as shown in FIG. 8A, the polyelectrolyte 82 is placed in a tightened state in the polyelectrolyte solution, thereby resulting in the reduction in viscosity of the polyelectrolyte solution. The inventor has also inferred that, when the concentration of water in the polyelectrolyte solution is slightly reduced, the polyelectrolyte 82 is loosened in the polyelectrolyte solution by an effect of an organic solvent contained in the polyelectrolyte solution as shown in FIG. 8B, thereby resulting in the increase in viscosity of the polyelectrolyte solution.

If, for example, the cathode catalyst layer 93a is produced by mixing the polyelectrolyte solution containing the polyelectrolyte 82 that has advanced to be tightened, the cathode catalyst layer 93a is considered to be in the state shown in FIG. 9. That is because the polyelectrolyte 82 is tightened in the cathode catalyst layer 93a, the side chain 101 extends in several directions. Then, the side chain 101 and water in the cathode catalyst layer 93a adhere to each other, whereby the hydrophilic layer 83 is formed in a dispersed manner in the cathode catalyst layer 93a. As a result, in the place where the polyelectrolyte 82 is tightened in the cathode catalyst layer 93a, the protons and the water are difficult to move in the cathode catalyst layer 93a due to ionic resistance in the cathode catalyst layer 93a. Accordingly, performance degradation is caused by drying of the polyelectrolyte 82 in the electrolyte membrane 91 and the catalyst layers under low humidified conditions, and caused by flooding under over-humidified conditions.

In order to solve the above-described problems, the inventor has repeatedly made eager studies to invent the apparatus for production of a fuel cell catalyst layer of the present invention. That is, because the concentration of water has the predetermined value or less in the polyelectrolyte solution obtained by the water removing means included in the apparatus, the polyelectrolyte solution has a high viscosity, and the side chain 101 of the polyelectrolyte 82 is difficult to adhere to the water in the polyelectrolyte solution. For this reason, the internal state of the polyelectrolyte solution is considered to be as shown in FIG. 1, that is, a state in which the polyelectrolyte 82 is loosened in the polyelectrolyte solution. Accordingly, in the catalyst paste obtained by mixing with the pre-paste using the agitating means, and also in the fuel cell catalyst layer obtained from the catalyst paste, the hydrophilic functional group such as a sulfone group adheres to water in the pre-paste. As a result, as shown in FIG. 6, in the fuel cell catalyst layer, the hydrophilic layer 83 of the polyelectrolyte 82 is formed in an oriented state to a surface of the catalyst 81. It is further considered that, because the sulfone group adheres to the water in the pre-paste as described above, the hydrophilic functional group in the side chain 101 of the polyelectrolyte 82 is placed in an oriented state toward the side of the catalyst 81 (PFF structure) so as to form the hydrophilic layer 83 on the catalyst 81 in the fuel cell catalyst layer. For this reason, in the fuel cell catalyst layer obtained with this production apparatus, as shown in FIG. 5, the protons and the water easily move, thus allowing the electrochemical reaction to proceed smoothly. As a result, in the MEA 90 having the fuel cell catalyst layer, the power generation capacity can be made high both under low humidified conditions and under over-humidified conditions.

Therefore, with the apparatus for production of a fuel cell catalyst layer of the present invention, it is possible to obtain the fuel cell catalyst layer in which the electrochemical reaction is smoothly performed.

In the apparatus for production of a fuel cell catalyst layer of the present invention, the water removing means is preferably a warming operation in hot water (claim 2). In this case, the concentration of water in the pre-solution can easily have the predetermined value or less, and thus, the polyelectrolyte solution of the present invention can be obtained easily.

The polyelectrolyte solution of the present invention is characterized in that a polyelectrolyte having a side chain including a hydrophilic functional group is dissolved in a solvent, and a concentration of water is 10% or less (claim 3).

Because the concentration of water is as low as 10% or less, the state of the polyelectrolyte solution of the present invention is considered to be as shown in FIG. 1, that is, the state in which the polyelectrolyte 82 is loosened in the polyelectrolyte solution. In the polyelectrolyte 82 in such a loosened state, the main chain 100 extends in one direction. For this reason, it is considered that, in the fuel cell catalyst layer in which the polyelectrolyte solution is mixed, the hydrophilic functional group and the water adhere to each other in one direction, and the hydrophilic layer 83 is aligned in one direction and placed in a continuous state in the fuel cell catalyst layer. As a result, in the fuel cell catalyst layer in such a state, the protons and the water easily move, thus allowing the electrochemical reaction to proceed smoothly.

Therefore, the polyelectrolyte solution of the present invention is preferable as a polyelectrolyte solution forming the fuel cell catalyst layer.

According to test results obtained by the inventor, the concentration of water in the polyelectrolyte solution is preferably 5% or less (claim 4). In this case, because the concentration of water in the polyelectrolyte solution is further reduced, the polyelectrolyte 82 in the polyelectrolyte solution is placed in a more loosened state, thus being easily placed in the state shown in FIG. 1.

The solvent preferably contains at least one type of secondary alcohols and tertiary alcohols (claim 5). According to tests conducted by the inventor, when the solvent contains a primary alcohol such as methanol or ethanol, the viscosity of the polyelectrolyte solution does not increase even if the water concentration is reduced. When the solvent contains a secondary alcohol such as isopropyl alcohol (IPA) or a tertiary alcohol such as tertiary butyl alcohol (TBA), the polyelectrolyte 82 in the polyelectrolyte solution is placed in a more loosened state. In addition, according to tests conducted by the inventor, when the solvent contains a secondary alcohol and a tertiary alcohol, the polyelectrolyte 82 in the polyelectrolyte solution is placed in a still more loosened state.

A process for production of a polyelectrolyte solution of the present invention is characterized by including a pre-solution preparing step for preparing a pre-solution in which a polyelectrolyte having a side chain including a hydrophilic functional group is dissolved in a solvent, and a solution preparation step for obtaining a polyelectrolyte solution by reducing a concentration of at least water in the pre-solution to 10% or less (claim 6).

With the process for production of the polyelectrolyte solution of the present invention, the polyelectrolyte solution having the above-described characteristics can be produced in a stable manner.

A method for production of a fuel cell catalyst layer forming a catalyst layer by a catalyst paste according to the present invention is characterized by including a water removal step for obtaining a polyelectrolyte solution by reducing to 10% or less a concentration of water in a pre-solution in which a polyelectrolyte having a side chain including a hydrophilic functional group is dissolved in a solvent, a pre-paste preparation step for producing a pre-paste by mixing a catalyst with water, and an agitation step for obtaining the catalyst paste by mixing the polyelectrolyte solution into the pre-paste (claim 7).

With the production method of the present invention, the concentration of water in the polyelectrolyte solution is reduced to 10% or less in the water removal step. Therefore, the polyelectrolyte solution has the above-described characteristics. As a result, the fuel cell catalyst layer formed by the catalyst paste obtained through the agitation step has the above-described characteristics.

Consequently, with the method for production of the fuel cell catalyst layer, it is possible to obtain the fuel cell catalyst layer in which the electrochemical reaction is smoothly performed.

BRIEF DESCRIPTION OF THE DRAWINGS

FIG. 1 is a schematic diagram showing a state of polyelectrolytes in a polyelectrolyte solution having a low water concentration.

FIG. 2 shows schematic diagrams illustrating steps for producing the polyelectrolyte solution in an experimental example 1.

BEST MODES FOR CARRYING OUT THE INVENTION

Description will be made below of examples 1 and 2 embodying the present invention, and experimental examples 1 and 2, with reference to the accompanying drawings.

Experimental Example 1

Figure 4:
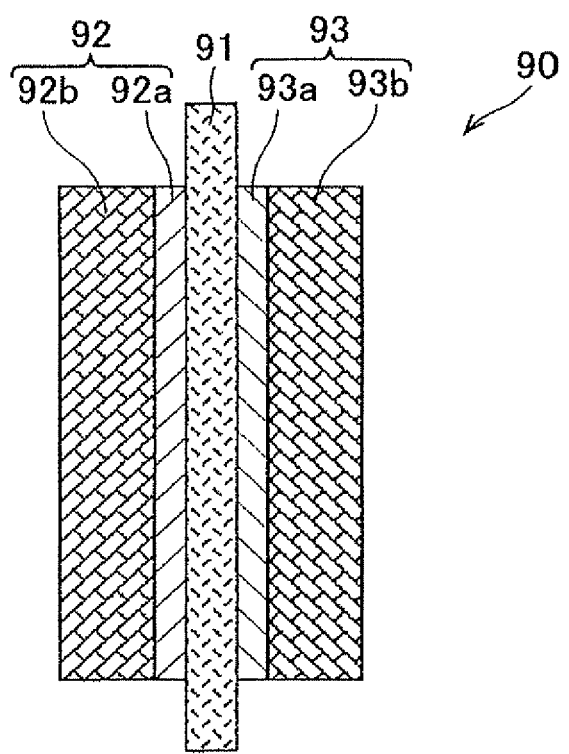
FIG. 4 is a schematic structure diagram showing an MEA of a related art and examples 1 and 2.

First, experiments described below were conducted to produce a cathode catalyst layer 93a, an anode catalyst layer 92a, and an MEA 90 that has the catalyst layers 93a and 92a, of each of the examples 1 and 2 shown in FIG. 4. In the experimental example 1, six types of polyelectrolyte solutions with different compositions and production steps were prepared, and the viscosity of each of the polyelectrolyte solutions was measured. Note that all of the polyelectrolyte solutions used in the examples 1 and 2, and the experimental example 1 were ionomer solution.

(Production of Sample A)

First, as a pre-solution, DE2020 (made by DuPont) was prepared to produce a polyelectrolyte solution of Sample A. Then, 10 g of DE2020 was put in a container and warmed in hot water at 85° C. as shown in FIG. 2A to evaporate water and normal propyl alcohol (NPA) that serve as a solvent in DE2020. By this warming operation in hot water, each content of water and NPA in DE2020 was reduced to 2 g. As a result, the content of each of water and NPA in DE2020 was equivalent to 5% when converted to a concentration in the polyelectrolyte solution of Sample A.

Next, 6.8 g of water was mixed into DE2020 after being warmed in hot water (refer to FIG. 2B), and the mixture was agitated for 3 minutes with a rotation-revolution type centrifugal mixer 35 (refer to FIG. 2C). Note that a Hybrid Mixer HM-500 (made by Keyence) was employed as the rotation-revolution type centrifugal mixer 35.

Figure 7:
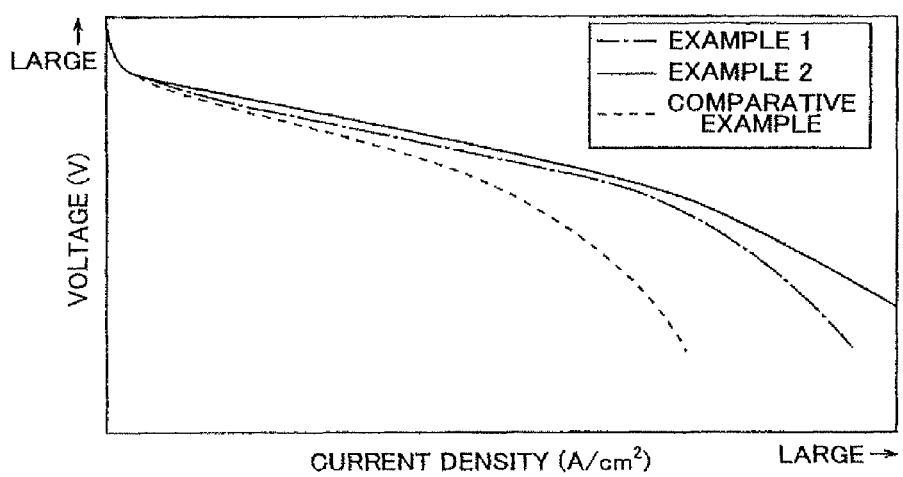
FIG. 7 is a graph showing changes in voltage of a cell with respect to current density of the cell in an experimental example 2.
Figure 8A:
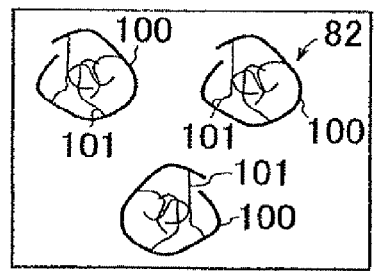
FIG. 8 shows schematic diagrams illustrating states of polyelectrolytes in a conventional polyelectrolyte solution.
Figure 8B:
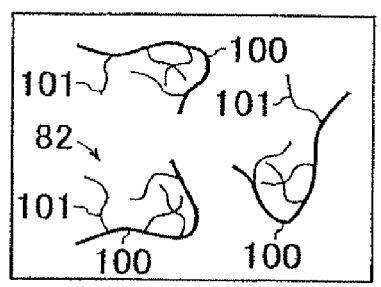
Figure 9:
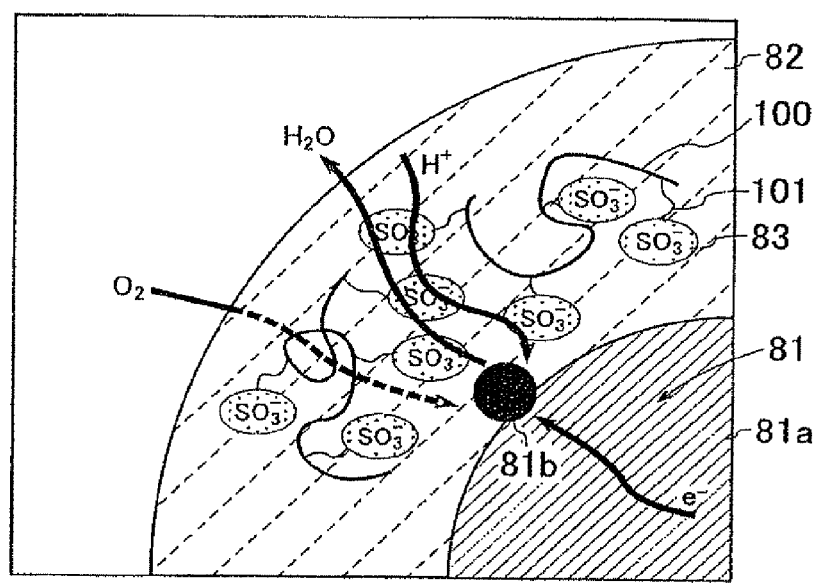
FIG. 9 is a schematic enlarged sectional view showing a conventional cathode catalyst layer.

Next, as shown in FIG. 2D, 7.2 g of NPA was mixed into the mixture of DE2020 and water. Thereafter, the mixture thus made was agitated in the rotation-revolution type centrifugal mixer 35 (refer to FIG. 2E). As shown in FIG. 2F, 20 g of IPA serving as an organic solvent was mixed into the mixture of DE2020, water, and NPA thus obtained. Then, the mixture thus made was agitated in the rotation-revolution type centrifugal mixer 35 (refer to FIG. 2O) to obtain the polyelectrolyte solution of Sample A (refer to FIG. 2H).

(Production of Sample B)

To produce a polyelectrolyte solution of Sample B, in the same manner as production of the polyelectrolyte solution of Sample A, 10 g of DE2020 was warmed in hot water at 85° C. to reduce each content of water and NPA in DE2020 to 2 g. As a result, the content of each of water and NPA in DE2020 was equivalent to 5% when converted to a concentration in the polyelectrolyte solution of Sample B.

Next, 20 g of WA was mixed into DE2020 after being warmed in hot water, and the mixture was agitated for 3 minutes with the rotation-revolution type centrifugal mixer 35. Then, 7.2 g of NPA was mixed into the mixture of DE2020 and IPA, and agitated in the rotation-revolution type centrifugal mixer 35. Then, 6.8 g of water was mixed into the mixture of DE2020, IPA, and NPA thus obtained. The mixture thus made was agitated in the rotation-revolution type centrifugal mixer 35 to obtain the polyelectrolyte solution of Sample B.

(Production of Sample C)

To produce a polyelectrolyte solution of Sample C, 20 g of IPA was mixed into 10 g of DE2020, and agitated for 3 minutes with the rotation-revolution type centrifugal mixer 35. Thereafter, 4.7 g of NPA was mixed into the mixture of DE2020 and IPA, and agitated in the rotation-revolution type centrifugal mixer 35. Then, 5.3 g of water was mixed into the mixture of DE2020, IPA, and NPA thus obtained. Then, the mixture thus made was agitated in the rotation-revolution type centrifugal mixer 35 to obtain the polyelectrolyte solution of Sample C. Because the warming operation in hot water was not applied to the production of the polyelectrolyte solution of Sample C, the content of water in DE2020 was equivalent to approximately 9% when converted to a concentration in the polyelectrolyte solution of Sample C. The content of NPA in DE2020 was equivalent to approximately 11% when converted to a concentration in the polyelectrolyte solution of Sample C.

(Production of Sample D)

Also in the production of a polyelectrolyte solution of Sample D, 10 g of DE2020 was warmed in hot water at 85° C. to reduce each content of water and NPA in DE2020 to 2 g. As a result, the content of each of water and NPA in DE2020 was equivalent to 5% when converted to a concentration in the polyelectrolyte solution of Sample D. Next, 34 g of NPA was mixed into DE2020 thus obtained, and the mixture was agitated for 3 minutes with the rotation-revolution type centrifugal mixer 35. Thus, the polyelectrolyte solution of Sample D was obtained.

(Production of Sample E)

Also in the production of a polyelectrolyte solution of Sample E, 10 g of DE2020 was warmed in hot water at 85° C. to reduce each content of water and NPA in DE2020 to 2 g. As a result, the content of each of water and NPA in DE2020 was equivalent to 5% when converted to a concentration in the polyelectrolyte solution of Sample E. Next, 34 g of IPA was mixed into DE2020 thus obtained, and the mixture was agitated for 3 minutes with the rotation-revolution type centrifugal mixer 35. Thus, the polyelectrolyte solution of Sample E was obtained.

(Production of Sample F)

Also in the production of a polyelectrolyte solution of Sample F, 10 g of DE2020 was warmed in hot water at 85° C. to reduce each content of water and NPA in DE2020 to 2 g. As a result, the content of each of water and NPA in DE2020 was equivalent to 5% when converted to a concentration in the polyelectrolyte solution of Sample F. Next, 34 g of a solution in a ratio of IPA:TBA=1:1 was mixed into DE2020 thus obtained, and the mixture was agitated for 3 minutes with the rotation-revolution type centrifugal mixer 35. Thus, the polyelectrolyte solution of Sample F was obtained.

(Production of Sample G)

Also in the production of a polyelectrolyte solution of Sample 10 g of DE2020 was also warmed in hot water at 85° C. However, each content of water, NPA, and a polyelectrolyte 82 in DE2020 was made to be approximately 33%. Next, 7.2 g of NPA was mixed into DE2020 after being warmed in hot water, and the mixture was agitated for 3 minutes with the rotation-revolution type centrifugal mixer 35. Thereafter, 6.8 g of water was added and further agitated. Then, 20 g of IPA was added and agitated to obtain Sample G.

A viscosity of each of the polyelectrolyte solutions of Samples A to G was measured at 20° C. Table 1 shows the measurement results. Note that Table 1 shows viscosity ratios of Samples B to G relative to the viscosity of Sample A that serves as a reference value. Table 1 also lists composition ratios of the polyelectrolyte, IPA, NPA, $H_2O$, and TBA, as well as the order of addition of the solvents in each of the polyelectrolyte solutions of Samples A to G.

TABLE 1

| Sample | Viscosity Ratio | Polyelectrolyte (%) | IPA (%) | NPA (%) | $H_2O$ (%) | TBA (%) | Order of Addition |
|---|---|---|---|---|---|---|---|
| A | 1.0 | 5 | 50 | 23 | 22 | 0 | $H_2O$ → NPA → IPA |
| B | 1.6 | 5 | 50 | 23 | 22 | 0 | IPA → NPA → $H_2O$ |
| C | 1.1 | 5 | 50 | 23 | 22 | 0 | IPA → NPA → $H_2O$ |
| D | 0.7 | 5 | 0 | 90 | 5 | 0 | NPA |
| E | 2.3 | 5 | 85 | 5 | 5 | 0 | IPA |
| F | 3.0 | 5 | 50 | 42.5 | 5 | 42.5 | IPA + TBA |
| G | 1.1 | 5 | 50 | 23 | 22 | 0 | NPA → $H_2O$ → IPA |

As shown in Table 1, the polyelectrolyte solutions of Samples A to C differed from each other in viscosity in spite of having the same composition ratio. From this fact, it was found out that the order of the solvents mixed into DE2020 is related to the change in viscosity. More in detail, by comparing the polyelectrolyte solution of Sample A with the polyelectrolyte solutions of Samples B and C, it was found that the viscosity is reduced by first mixing water into DE2020. In addition, by comparing the polyelectrolyte solution of Sample B with the polyelectrolyte solution of Sample C, it was found that the viscosity of polyelectrolyte solution is lower before IPA is mixed, that is, as the ratio of water and NPA is larger in DE2020 serving as a pre-solution.

Moreover, from the measurement results for the polyelectrolyte solution of Sample D, it was found that the viscosity is lower when NPA alone is mixed into DE2020. On the other hand, from the measurement results for the polyelectrolyte solutions of Samples E and F, it was found that the viscosity is higher when IPA is mixed and when IPA and TBA are mixed. Because the viscosity is higher as the ratio of water, that is, the concentration of water, in the polyelectrolyte solution is lower, it is considered that the polyelectrolyte 82 in the polyelectrolyte solutions of Samples E and F is in a state in which a main chain 100 and side chains 101 are loosened as shown in FIG. 1. That is, it can be inferred that IPA, and a combination IPA and TBA have an effect of loosening the polyelectrolyte 82 in the polyelectrolyte solution whereas, in contrast, water and NPA have an effect of tightening the polyelectrolyte 82 in the polyelectrolyte solution. It can also be inferred that NPA has a high effect of tightening the polyelectrolyte 82 in the polyelectrolyte solution.

Thus, it can be inferred that primary alcohols, such as NPA and ethanol, and water have an effect of tightening the polyelectrolyte whereas secondary alcohols, such as IPA, and tertiary alcohols, such as TBA, have an effect of loosening the polyelectrolyte. The above-described effect of secondary alcohols and tertiary alcohols is considered to result from permittivity. It can be inferred that solvents having a permittivity of 20 or less have a high effect of loosening the tightness of polyelectrolytes.

Example 1

Production of Cathode Catalyst Layer 93a and Anode Catalyst Layer 92a

Based on the experimental results described above, the MEA 90 of the example 1 shown in FIG. 4 was produced. A cathode 93 of this MEA 90 is, as shown above, composed of the cathode catalyst layer 93a serving as a fuel cell catalyst layer and a base material 93b formed of gas diffusion layer base material.

First of all, a catalyst paste 42 forming the cathode catalyst layer 93a was produced. To produce the catalyst paste 42, first, a catalyst 81 was prepared, in which a support 81a made of carbon black supports Pt fine particles serving as catalyst metal fine particles 82b at a supporting density of 50 wt %.

Figure 3A:
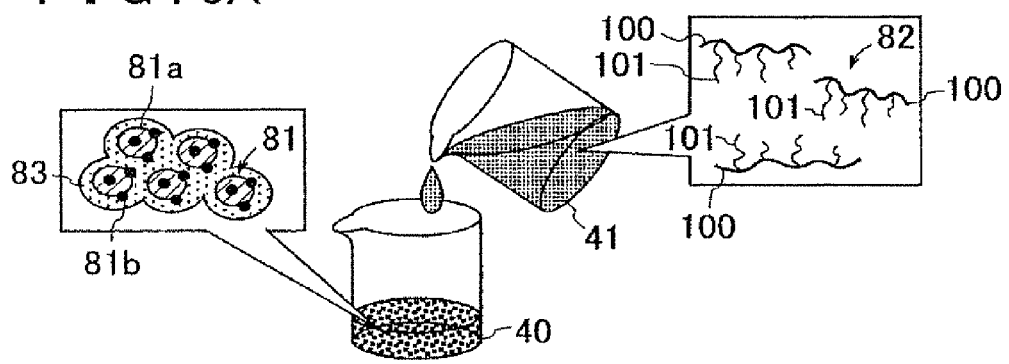
FIG. 3 shows schematic diagrams illustrating production steps of a catalyst paste in examples 1 and 2.

Then, the catalyst 81 and water were mixed at a ratio of 1 g of the catalyst 81 to 5 g of water, and the mixture was agitated in the rotation-revolution type centrifugal mixer 35 to obtain a pre-paste 40 (refer to FIG. 3A).

Next, a polyelectrolyte solution 41 to be mixed with the pre-paste 40 was prepared. The polyelectrolyte solution 41 had the same composition as that of the polyelectrolyte solution produced as Sample B in the above-described experimental example 1. That is, the polyelectrolyte solution 41 had a concentration of water of 22%. Note that the warming operation in hot water conducted to obtain the polyelectrolyte solution 41, that is the warming operation in hot water in the production of the polyelectrolyte solution of Sample B corresponds to water removing means in an apparatus for production of a fuel cell catalyst layer of the present invention and a water removal step in a method for production of a fuel cell catalyst layer of the present invention.

Figure 3B:
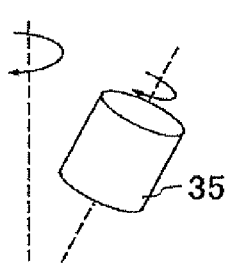

Then, 10 g of the polyelectrolyte solution 41 was mixed into the pre-paste 40, and the mixture was agitated in the rotation-revolution type centrifugal mixer 35 as shown in FIG. 3B. Thus, the catalyst paste 42 was produced (refer to FIG. 3C). Note that the rotation-revolution type centrifugal mixer 35 corresponds to agitating means in the apparatus for production of a fuel cell catalyst layer of the present invention, and the agitation by the rotation-revolution type centrifugal mixer 35 corresponds to an agitation step in the method for production of a fuel cell catalyst layer of the present invention.

The catalyst paste 42 produced above was applied onto the base material 93b to form the cathode catalyst layer 93a. The base material 93b was obtained by laminating carbon black provided with water-repellent treatment with PTFE and carbon cloth serving as an electron-conductive base material. Note that it is possible to employ, as the base material 93b, a material such as carbon paper on which a water-repellent layer composed of a mixture of carbon black and PTFE. As a method of applying the catalyst paste 42 onto the base material 93b, it is possible to employ means such as screen printing, a spraying method, and an ink-jet method.

The cathode 93 was obtained as a result of drying of the cathode catalyst layer 93a on the base material 93b. The anode catalyst layer 92a and an anode 92 were also obtained by the same process.

<Production of MEA 90>

Then, the anode 92, an electrolyte membrane (Nation membrane NR-211) 91, and the cathode 93 are stacked in this order, and bonded to each other by hot pressing at a temperature of 140° C. and a pressure of 40 kgf/cm$^2$. Thus, the MEA 90 was produced.

Figure 3C:
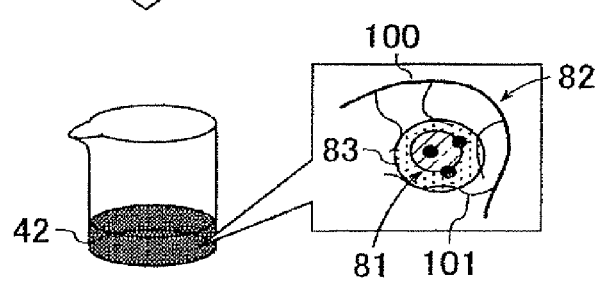
Figure 5:
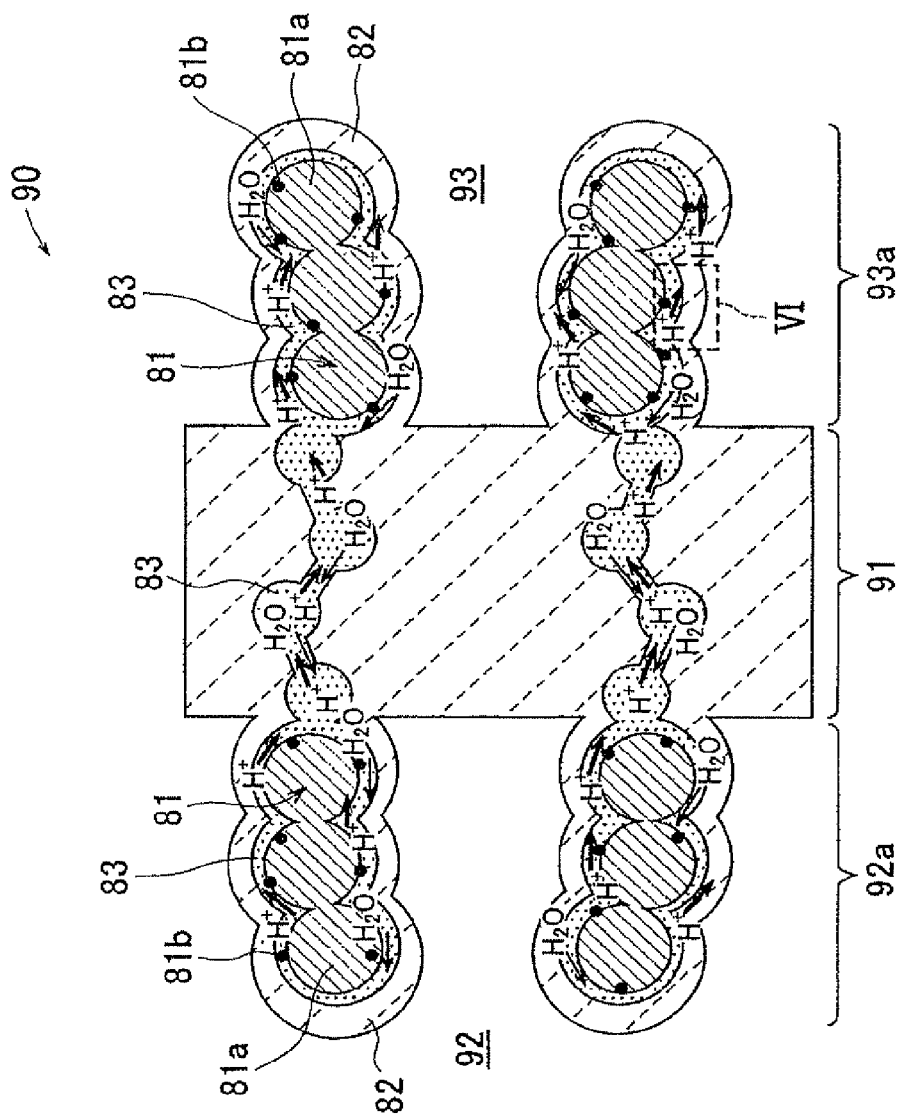
FIG. 5 is a schematic enlarged sectional view of the MEA of the related art and the examples 1 and 2.
Figure 6:
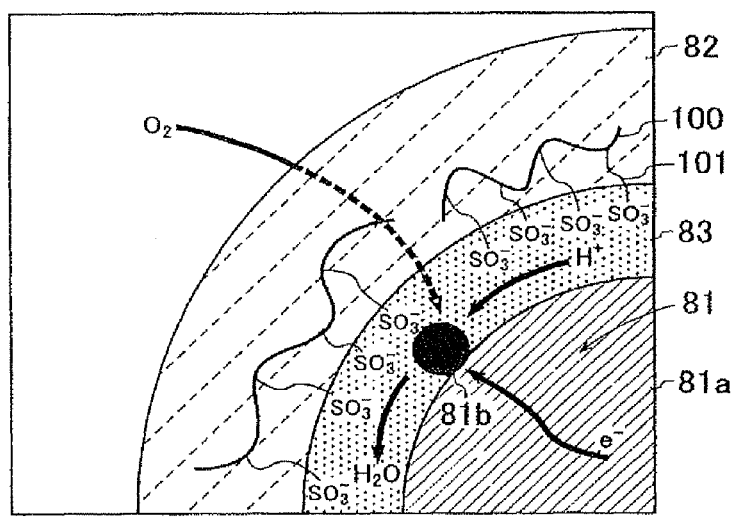
FIG. 6 is a schematic enlarged sectional view of a part VI in the MEA of the examples 1 and 2.

In the MEA 90, the polyelectrolyte solution 41 in which the concentration of water is 5% has been mixed with the pre-paste 40 when producing the catalyst paste 42 forming the cathode catalyst layer 93a and the anode catalyst layer 92a. As shown in FIG. 3A, it is considered that the polyelectrolyte 82 is in a loosened state in the polyelectrolyte solution 41. It is also considered that the main chain 100 is placed in an extending state in one direction in the polyelectrolyte 82 in such a loosed state. Accordingly, as shown in FIG. 3C, a sulfone group adheres to water in the pre-paste 40. As a result, in the cathode catalyst layer 93a and the anode catalyst layer 92a that are obtained from the catalyst paste 42, a layer of the polyelectrolyte 82 is formed in an oriented state to a surface of the catalyst 81, as shown in FIG. 6. It is further considered that, because the sulfone group adheres to the water in the pre-paste 40 as described above, the hydrophilic functional group in the side chain 101 of the polyelectrolyte 82 is placed in an oriented state toward the side of the catalyst 81 (PFF structure) so as to form a hydrophilic layer 83 on the catalyst 81 in the cathode catalyst layer 93a and the anode catalyst layer 92a, as shown in FIG. 6. For this reason, in the cathode catalyst layer 93a and the anode catalyst layer 92a obtained with this production method, as shown in FIG. 5, protons and water easily move, thus allowing an electrochemical reaction to proceed smoothly. As a result, in the MEA 90 having the cathode catalyst layer 93a and the anode catalyst layer 92a obtained as described above, power generation capacity can be made high both under low humidified conditions and under over-humidified conditions.

Therefore, with the production method of the example 1, it is possible to obtain the cathode catalyst layer 93a and the anode catalyst layer 92a in which the electrochemical reaction is smoothly performed, and consequently to obtain the MEA 90 in which the electrochemical reaction is smoothly performed.

Example 2

In an MEA 90 of the example 2, a cathode catalyst layer and an anode catalyst layer are formed by a catalyst paste obtained by mixing the pre-paste 40 with the polyelectrolyte solution of Sample E (with water concentration of 5%) in the above-described experimental example 1. Other compositions and the production method are the same as those of the example 1.

Next, in order to know voltage characteristics of the MBA 90 obtained in the examples 1 and 2, verification by experiments was conducted using cells provided with the MEA 90 and a cell provided with an MEA of a comparative example shown below. Note that a composition and a production method of the cells are the same as known composition and method.

Comparative Example

In an MEA of the comparative example, a cathode catalyst layer and an anode catalyst layer are formed by a catalyst paste obtained by mixing the pre-paste 40 with the polyelectrolyte solution of Sample A (with water concentration of 22%) in the above-described experimental example 1. Other compositions and the production method are the same as those of the examples 1 and 2.

In this experimental example 2, a cell temperature of each of the cells provided with the MEAs 90 of the examples 1 and 2, and the cell provided with the MEA of the comparative example was set to 50"C, and under the measurement environment of a humidity of 100%, the change in current and voltage of each of the cells was measured when hydrogen was supplied to the anode 92 and oxygen was supplied to the cathode 93. FIG. 7 shows results of the measurement.

In FIG. 7, the horizontal axis represents a current density (A/cm$^2$) of a cell, and the vertical axis represents a cell voltage (V). As shown in FIG. 7, the reduction in the voltage as the current density increases is the smallest for the cell provided with the MEA 90 of the example 2. That is, it can be stated that the MEA 90 of the example 2 has the highest power generation capacity.

In addition, from these experimental results, it was found that the power generation capacity of the MEA is higher, that is, the electrochemical reaction is performed more smoothly, as the viscosity of the polyelectrolyte solution is higher. Moreover, it was found from comparison between the comparative example and the example 1 that the power generation capacity of the MEA tends to be higher as the viscosity of the polyelectrolyte solution is higher even if the concentration of water in the polyelectrolyte solution is the same. That is, it was found that the power generation capacity of the MEA changes depending on the order of mixing the solvent into the polyelectrolyte solution.

The present invention has been described above in accordance with the examples 1 and 2. However, the present invention is not limited to the examples 1 and 2, but can obviously be applied by making appropriate changes as far as they do not depart from the gist of the present invention.

INDUSTRIAL APPLICABILITY

The present invention can be used in a power supply for moving an object such as an electric vehicle, or in a stationary power supply.

DESCRIPTION OF THE REFERENCE NUMERALS

42—catalyst paste
92a, 93a—catalyst layer (92a: anode catalyst layer, 93a: cathode catalyst layer)
101—side chain
82—polyelectrolyte
41—polyelectrolyte solution
81—catalyst
40—pre-paste

The invention claimed is:

1. A process for production of a polyelectrolyte solution, the process comprising:
    a pre-solution preparing step for preparing a pre-solution in which a polyelectrolyte having a side chain including a hydrophilic functional group is dissolved in a solvent in a way so that the polyelectrolyte is in a loosened state, wherein said solvent comprises at least 50% of a tertiary alcohol; and
    a solution preparation step for obtaining a polyelectrolyte solution by reducing a concentration of at least water in the pre-solution to 10% or less.

2. The process for production of a polyelectrolyte solution according to claim 1, wherein the water reduction step is a warming operation in hot water.

3. The process for production of a polyelectrolyte solution according to claim 1, wherein the concentration of water is 5% or less.

4. The process for production of a polyelectrolyte solution according to claim 1, wherein in the loosened state, the polyelectrolyte has a main chain extending substantially in one direction.

* * * * *